(No Model.)
J. J. SWAIN.
GARDEN TOOL.
No. 265,460.  Patented Oct. 3, 1882.
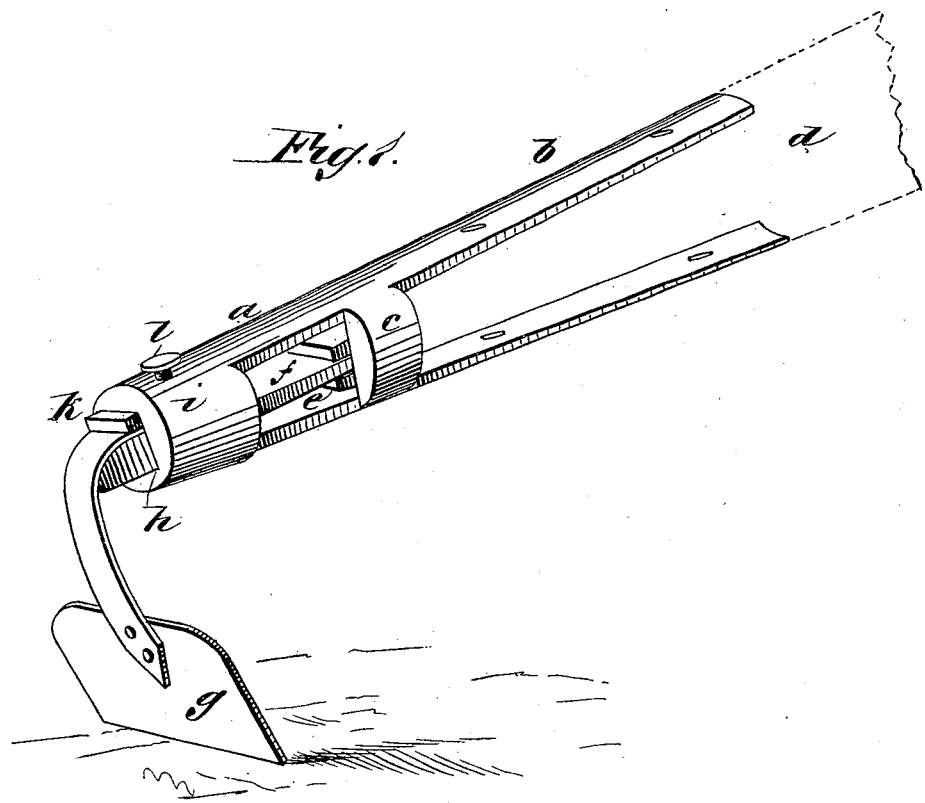
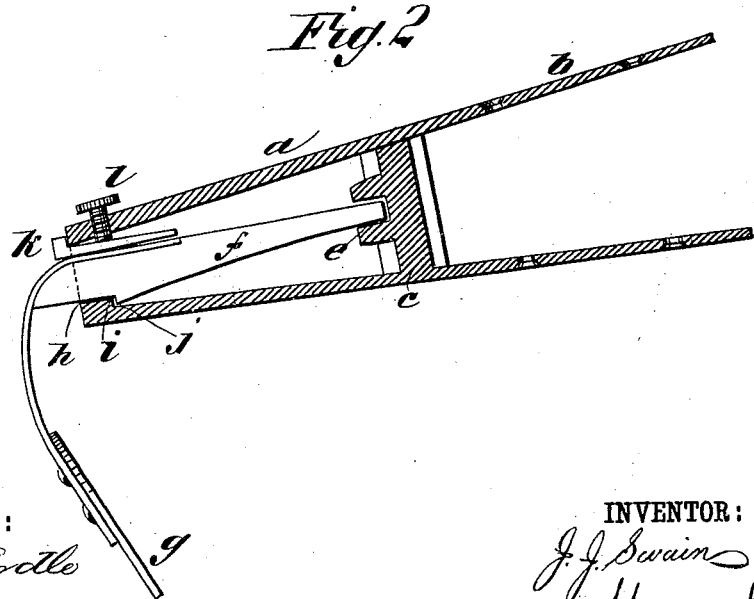
WITNESSES:
INVENTOR:
J. J. Swain
BY
ATTORNEYS.

UNITED STATES PATENT OFFICE.

JOSEPH J. SWAIN, OF MONTEVALLO, ALABAMA.

GARDEN-TOOL.

SPECIFICATION forming part of Letters Patent No. 265,460, dated October 3, 1882.

Application filed July 25, 1882. (No model.)

*To all whom it may concern:*

Be it known that I, JOSEPH J. SWAIN, of Montevallo, in the county of Shelby and State of Alabama, have invented certain new and useful Improvements in Garden-Tools, of which the following is a full, clear, and exact description.

My invention consists of an improved contrivance of the handle-socket and the shank of a hoe or other tool for a ready and simple means of detachably connecting them together, so that one handle may serve for a whole set of hoes, weeders, rakes, and other forms of hand-tools employed in garden-work, all as hereinafter described.

Reference is to be had to the accompanying drawings, forming part of this specification, in which similar letters of reference indicate corresponding parts in both the figures.

Figure 1 is a perspective view of a garden-hoe constructed according to my invention, and Fig. 2 is a longitudinal section of the socket.

I make an extension, $a$, of the handle-socket $b$ a suitable length beyond the head $c$, where the handle $d$ terminates, with a notch, $e$, in the outer side of said head to receive the end of the tang $f$ of the hoe $g$ or other tool, as shown; also, with a suitable hole at $h$ through the head $i$ of the extension $a$ for inserting the tang $f$, on which I make a shoulder, $j$, to drop behind the shoulder of the head $i$, through which the tang passes, and I secure said tang by a key, $k$, and a set-screw, $l$, as shown, the whole arrangement being very simple to construct and also simple to connect and disconnect for changing the hoes or other tools, all of which will have a tang, $f$, and shoulder $j$ fitted for the socket.

By means of my improved detachable connecting device for the tools a considerable economy will result in the first cost of a set of tools, in consequence of one handle serving for the whole, and the tools, which wear out while the handle remains serviceable, may be removed from time to time without the cost of new handles.

Having thus fully described my invention, I claim as new and desire to secure by Letters Patent—

1. The combination, with the handle-socket $b$, having extension $a$, notch $e$, and hole $h$, the hoe or other tool $g$, having shank $f$ and shoulder $j$, of the key $k$ and set-screw $l$, substantially as described.

2. A socket, $b$, for a hoe-handle, having an extension, $a$, notch $e$, and hole $h$ for the connection of the tang $f$ of a hoe or other garden-tool, substantially as described.

3. A handle-socket having the cross-head $c$ provided with a notch, $e$, which receives and holds firmly the end of tang $f$, as shown and described.

4. The combination, with head $c$, having notch $e$, of a handle-socket and tool-tang provided with corresponding shoulders, $i$ $j$, to prevent the tang from working forward out of the notch $e$, as described.

5. The combination, with the correspondingly-shouldered handle-socket and tool-tang, of the wedge $k$ and set-screw $l$, as described, to prevent the tang from being lifted so as to separate the shoulders.

JOSEPH J. SWAIN.

Witnesses:
HENRY WILSON,
E. S. LYMAN.